US009854029B1

(12) United States Patent
Kohlmeier et al.

(10) Patent No.: US 9,854,029 B1
(45) Date of Patent: Dec. 26, 2017

(54) SYSTEMS FOR DETERMINING IMPROPER ASSIGNMENTS IN STATISTICAL HYPOTHESIS TESTING

(71) Applicant: AMAZON TECHNOLOGIES, INC., Seattle, WA (US)

(72) Inventors: Sebastian Kohlmeier, Mountlake Terrace, WA (US); Rusli Ciandy, Seattle, WA (US); Rui Chen, Seattle, WA (US); Sameer Rajendra Rajyaguru, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 265 days.

(21) Appl. No.: 14/533,023

(22) Filed: Nov. 4, 2014

(51) Int. Cl.
*H04L 29/08* (2006.01)
*H04L 29/06* (2006.01)

(52) U.S. Cl.
CPC .............. *H04L 67/10* (2013.01); *H04L 67/42* (2013.01)

(58) Field of Classification Search
CPC ................................ H04L 67/10; H04L 67/42
See application file for complete search history.

(56) References Cited

U.S. PATENT DOCUMENTS

| | | | |
|---|---|---|---|
| 7,039,656 B1* | 5/2006 | Tsai ........................ | G06F 21/31 |
| 7,554,983 B1* | 6/2009 | Muppala ............. | H04L 12/2697 370/392 |
| 8,185,608 B1 | 5/2012 | York et al. | |
| 9,356,883 B1* | 5/2016 | Borthakur ........... | H04L 41/5025 |
| 2004/0039921 A1* | 2/2004 | Chuang ................... | G06F 21/51 713/187 |
| 2005/0132018 A1* | 6/2005 | Milic-Frayling . | G06F 17/30876 709/213 |
| 2011/0231821 A1* | 9/2011 | Sahni .................. | G06F 11/3688 717/124 |
| 2012/0297030 A1* | 11/2012 | Knobel ..................... | G06F 8/65 709/219 |
| 2014/0122706 A1* | 5/2014 | Boerner .............. | H04L 41/5041 709/224 |
| 2014/0201344 A1* | 7/2014 | Copsey ................... | G06F 9/505 709/223 |
| 2014/0244708 A1* | 8/2014 | Taine ..................... | H04L 65/40 709/201 |
| 2015/0106502 A1* | 4/2015 | Shakhmetov .......... | H04L 47/76 709/224 |
| 2015/0351071 A1* | 12/2015 | Pandey ............... | H04W 64/003 455/456.1 |
| 2016/0065428 A1* | 3/2016 | Srivastava ........... | H04L 43/065 370/242 |

* cited by examiner

*Primary Examiner* — Uzma Alam
(74) *Attorney, Agent, or Firm* — Lindauer Law, PLLC

(57) ABSTRACT

Described are techniques for performing statistical hypothesis experiments and determining user responses that do not match an assigned treatment. One of multiple experiment states may be assigned to a set of client devices. Response data that includes indications of the experiment state that was executed may be compared to the assigned experiment state to determine allocation matches and allocation mismatches. The allocation mismatches may be separated based on the assigned and executed experiment states to determine mismatches caused by preexisting content stored on a client device and mismatches caused by other experiment parameters.

20 Claims, 8 Drawing Sheets

SYSTEMS FOR DETERMINING IMPROPER ASSIGNMENTS IN STATISTICAL HYPOTHESIS TESTING

BACKGROUND

Statistical hypothesis testing is used to improve marketing and business intelligence by comparing user responses to two or more variants of a user experience. One form of statistical hypothesis testing includes "A/B" testing in which user responses to an "A" alternative and a "B" alternative of a user experience are tested. The presence of cached content or stale experiment states on devices may result in a selection bias that favors one alternative over other alternatives due to the failure of one or more devices to obtain or output a newer experiment state. Skewed response data is not statistically valid and may obscure the presence of other errors in experimental parameters.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
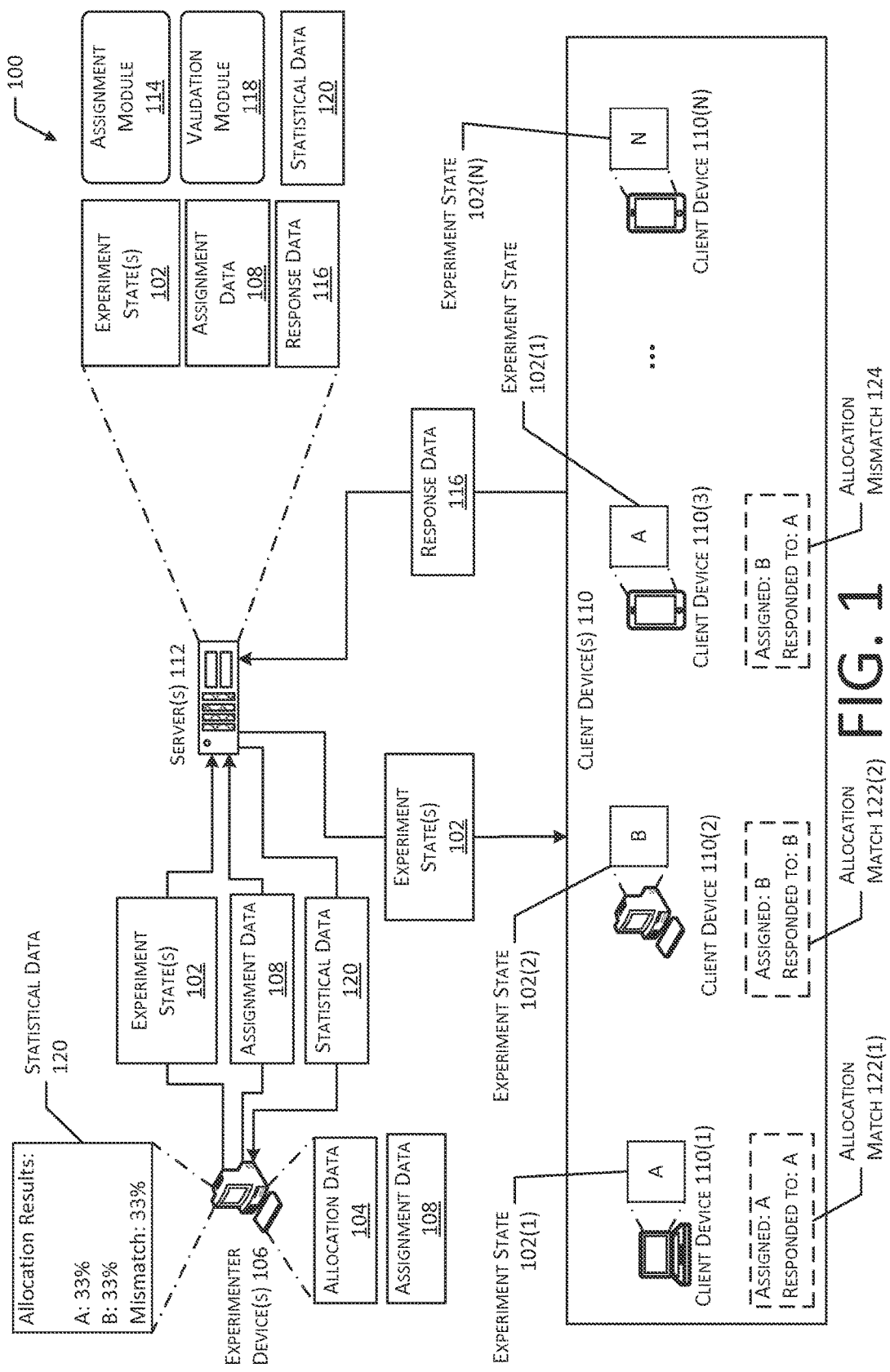
FIG. 1 depicts a system for assigning experiment states to client devices and receiving response data therefrom.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Statistical hypothesis testing is an experimental process in which one of two (or more) variants of a user experience is assigned and presented to multiple users. Responses from the users for an assigned variant are recorded to determine the effectiveness of the variant. Statistical hypothesis testing may include A/B testing and other similar types of experiments, such as multiple-sample hypothesis, multivariate, or multinomial testing. In some implementations in which A/B testing is performed, the first variant may include an existing user experience, dubbed the control, while the second variant may include one or more modifications to the user experience, dubbed a treatment or test. For example, an existing version of a website or mobile application may include a first experiment state (a control state), which may include a set of one or more features presented to a user. An experiment state may include data or other content that manifests itself as content or a set of features seen, heard, or otherwise interacted with by one or more users. To determine the effect of a second experiment state (a test or treatment state) on user responses, one of either the first experiment state or the second experiment state may be assigned (e.g., randomly or pseudo-randomly) to a group of users, in equal amounts or using an unequal allocation ratio. Response data received, by a server or other device implementing the system, from client devices to which the first experiment state was assigned may be compared to response data received from client devices to which the second experiment state was assigned. Response data received from client devices of users may include a session identifier identifying the interaction between the user and the assigned experiment state and a state identifier indicating the experiment state to which the user responded.

When at least one experiment state includes content stored and executed on a client device, such as native applications, the client device may present content associated with the stored experiment state. If this occurs, the user may be presented with an experiment state other than the experiment state that was assigned to the client device. Across a population of users, mismatches between the assigned experiment state and the experiment state indicated in the response data received from users may create a selection bias of sufficient significance to render the experiment statistically invalid.

This disclosure describes systems, methods, and computer-readable media configured to identify mismatches between experiment states allocated to a device and experiment states indicated in the response data received from the device. Allocation mismatches may be segregated based on the assigned experiment state and the experiment state received in the response data to identify mismatches potentially caused by cached content or currently-executed applications, which may include older experiment states. Separation of allocation mismatches caused by cached content or older experiment states from the response data may reduce or eliminate the effect of the selection bias on the response data, such that the remaining response data becomes statistically valid. Separation of allocation mismatches caused by cached content or older experiment states from other allocation mismatches may facilitate the identification of mismatches caused by other errors, such as the manner in which experiment states are assigned or the manner in which response data is received from client devices. For example, an error in the manner in which an experiment was initiated or ended, or in the manner in which experiment states were allocated to client devices may result in allocation mismatches biased toward different experiment states than the allocation mismatches caused by cached content or older experiment states. In some implementations, one or more allocation mismatches may include metadata or other information indicating a source corresponding to the mismatch. For example, the metadata may include a date or time that a cache was last updated, portions of code or other executable content that caused assignment or execution of an experiment state by a device, a version identifier associated with the executed experiment state, and so forth.

At least two experiment states, having a respective state identifier associated therewith, may be assigned to a plurality of client devices. The experiment states assigned to one or more of the plurality of client devices may be stored in a data store. When a session is established by initiating a connection with a client device, a session identifier may be assigned to the session, and the content associated with the assigned experiment state may be presented to a user of the client device. Response data received from the client device may include the session identifier and the state identifier corresponding to the experiment state that was presented to the user.

The received state identifier may be compared to the assigned experiment state for the client device from which the state identifier was received to determine whether the response data matches the allocated experiment state or whether an allocation mismatch has occurred. Output comprising statistical data may be generated, in which the statistical data may indicate allocation matches corresponding to one or more experiment states as well as allocation mismatches.

By way of example, native applications executed on client devices may be updated to incorporate new experiment states in phases, or one or more users may refrain from updating a native application on that user's client device. In some cases, an older experiment state may remain stored as cached content on a client device. In other cases, a user may permit a native application to continue running on the client device as a background application. In other cases, a client device may either not have yet received the assigned experiment state or a user may have refrained from updating a native application on the client device. While a new experiment state may be assigned to such a client device, when a session is established with a client device on which a different experiment state is stored as native content, content associated with the cached, running, or older experiment state may be presented to the user instead of the assigned experiment state. If the cached, running, or older experiment state is an existing version of a user experience (e.g., a control state) that is being tested alongside a modified version (e.g., a treatment state), the existence of users that respond to the control state when assigned the treatment state will create a selection bias in the experiment. If the selection bias across a group of client devices is statistically significant, the response data for the experiment may be rendered statistically invalid. In some cases, the cached, running, or older experiment state may include an older version of an experiment state or a different experiment state from any of the states being tested, rendering the response received from that client device useless.

By comparing response data that includes an indication of the experiment state that was presented to a client device to assignment data that includes the experiment state that was assigned to the client device, allocation mismatches may be identified and output separately from other response data. Separation of allocation mismatches from response data may eliminate the statistical effect of the mismatches on the response data, converting data that would otherwise be statistically invalid into statistically valid data. Separation of the allocation mismatches may also facilitate the identification of errors based on the manner in which the experiment was initiated or ended, the process by which experiment states were assigned, or other experimental parameters.

In some implementations, determined allocation mismatches may be separated based on the assigned experiment state and the response experiment state to which the allocation mismatch corresponds. For example, allocation mismatches corresponding to assignment of a new experiment state (e.g., a treatment state) and a response of an older, preexisting experiment state (e.g., a control state) may likely indicate that the mismatch occurred due to the presence of cached content, a currently-running application, or a failure to provide (e.g., update or push) the new experiment state to one or more client devices. Allocation mismatches corresponding to assignment of a preexisting experiment state and a response of a newer experiment state may indicate other errors in the experiment parameters. Separation of allocation mismatches may thereby facilitate the identification and subsequent correction of errors by enabling the identification of errors caused by cached content, running applications, and failure to push new experiment states from errors in the manner in which the experiment was implemented.

In one implementation, when testing an existing experiment state (e.g., a control state) and a new experiment state (e.g., a treatment state), the control state may be replaced by a substitute control state that causes presentation of the same content as those of the control state, while having a different state identifier associated therewith. The treatment state and the substitute control state may be assigned to client devices. Any response data that includes a state identifier associated with the original control state may be determined to be an allocation mismatch caused by cached content, a running application, or a failure to push a newer experiment state to a device. This determination may be made due to the fact that the original control state was not assigned to any of the client devices. Response data that indicates a state identifier associated with the treatment state when the substitute control state was assigned, or the substitute control state when the treatment state was assigned, may indicate an allocation mismatch caused by an error in an experimental parameter.

Implementations described herein may identify and separate allocation mismatches from other response data for a statistical hypothesis experiment, such as A/B testing or other similar experiments, to avoid statistical invalidity of the response data, while facilitating the identification of errors due to cached content and errors due to other experiment parameters. Implementations described herein may enable an experimenter to reassign experiment states to different client devices without interrupting the experiment. Implementations described herein may also enable the experimenter to replace experiment states with newer versions thereof or with different experiment states entirely.

FIG. 1 depicts a system 100 for assigning experiment states to client devices and receiving response data therefrom. A plurality of experiment states 102 and allocation data 104 associated with the experiment states 102 may be generated or accessed by one or more experimenter devices 106 associated with an originator of a statistical hypothesis experiment. An experiment state 102 may include any manner of data that manifests itself as content or features seen, heard, or otherwise interacted with by one or more users. The allocation data 104 may include a desired distribution of the experiment states 102, which may be expressed as percentages, a ratio, one or more fixed quantities, and so forth. For example, the allocation data 104 may indicate a distribution of 50% with regard to a first experiment state 102(1) and 50% with regard to a second experiment state 102(2). The experimenter device(s) 106 may include, without limitation, one or more mobile devices, smartphones, set-top boxes, tablet computers, personal computers, wearable computers, or other types of computing devices. The experimenter device(s) 106 may process the allocation data 104 to generate assignment data 108, which may include one or more identifiers associated with experiment states 102, stored in association with identifiers associated with client devices 110. The assignment data 108 may thereby include the experiment state 102 that was assigned to each of a subset of client devices 110. The experiment states 102 and assignment data 108 may be provided to one or more servers 112. In some implementations, the experiment states 102 and allocation data 104 or assignment data 108 may be input to the server(s) 112 directly, and the server(s) 112 may be used to generate and perform a statistical hypothesis experiment, such that use of separate experimenter device(s) 106 may be omitted. In other implementations, one or more experimenter devices 106 may interact with one or more client devices 110 directly to perform the statistical hypothesis experiment, and use of one or more intermediate servers 112 may be omitted. In other implementations, the experimenter device(s) 106 may provide the allocation data 104 to the server(s) 112, and the server(s) 112 may generate the assignment data 108 using the allocation data 104.

In the depicted implementation, a user (not shown) associated with the experimenter device(s) 106 may intend to compare responses of other users to a first experiment state 102(1) and a second experiment state 102(2). The first experiment state 102(1) may include a preexisting user experience that presents one or more features or other content to a user, such as a website, an application, and so forth. The second experiment state 102(2) may include a modified version of the preexisting user experience. For example, the second experiment state 102(2) may include different visual or audio content or a different arrangement of content when compared to the first experiment state 102(1). Because the first experiment state 102(1) relates to a preexisting user experience, one or more client devices 110 may have the first experiment state 102(1) stored thereon.

The allocation data 104 generated or accessed by the experimenter device(s) 106 may include a distribution of the experiment states 102 to client devices 110, which may be expressed as percentages, a ratio, one or more fixed quantities, and so forth. While a generally equal distribution of experiment states 102 to client devices 110 is typically performed to facilitate statistical validity of an experiment, in some implementations, the allocation data 104 may include an unequal distribution of experiment states 102. An assignment module 114 in the server(s) 112 may be used to receive assignment data 108 corresponding to the allocation data 104, and provide the experiment states 102 to respective client devices 110. The assignment data 108 may include identifiers for one or more client devices 110 and for the experiment states 102 that were assigned to the one or more client devices 110.

In some implementations, assignment of experiment states 102 to respective client devices 110 may be performed on a random or pseudo-random basis. For example, a pseudo-random number generator (PRNG) may be used to determine a pseudo-random basis for assigning experiment states 102 to respective client devices 110. Assignment of experiment states 102 to client devices 110 may be performed independent of preexisting experiment states 102 or other content on the client devices 110. Further, the assignment of an experiment state 102 to a respective client device 110 may replace previous experiment states 102 or assignments provided to that client device 110. As such, the experimenter device 106 may be used to generate or access allocation data 104 intended to replace previously accessed allocation data 104, or to generate or access experiment states 102 intended to replace previously provided experiment states 102 to seamlessly continue or restart a statistical hypothesis experiment. In contrast, conventional systems for conducting statistical hypothesis experiments are limited to assignment of a single, fixed experiment state to a device and are typically able to modify the distribution of experiment states only when assigning experiment states to new devices added to the experiment.

FIG. 1 depicts the server(s) 112 providing the experiment states 102 to a plurality of client devices 110. A respective client device 110 may be assigned one of the experiment states 102, and an indication of the experiment state 102 assigned to the respective client device 110 may be stored in the server(s) 112. In some implementations, a client device 110 may be provided with multiple experiment states 102, and data provided to the client device 110 concurrently with the experiment states 102 or at a future time may determine which of the multiple experiment states 102 is executed. In other implementations, a client device 110 may be provided with only the experiment state 102 assigned to that client device 110. In still other implementations, a client device 110 may have existing content corresponding to one or multiple experiment states 102 stored thereon, such that the provision of that experiment state 102 to the client device 110 is unnecessary.

In the depicted implementation, the first experiment state 102(1) is assigned to a first client device 110(1). The client device 110(1) executes content associated with the experiment state 102(1), with which a user associated therewith may interact. The second experiment state 102(2) is assigned to a second client device 110(2). The client device 110(2) executes content associated with the experiment state 102(2), with which a user associated therewith may interact. The experiment state 102(2) is assigned to a third client device 110(3). However, the client device 110(3) executes the experiment state 102(1). This may occur due to the experiment state 102(1) being stored in association with the client device 110(3), such as in the form of cached content. For example, if the experiment state 102(2) has not yet been provided to the client device 110(3) or processed by the client device 110(3), and communication with the server(s) 112 to obtain the experiment state 102(2) is not possible or would introduce latency sufficient to distort the user expedience, the third client device 110(3) may instead execute cached content. As an additional example, if the experiment state 102(1) was previously executed by the client device 110(3) and remains currently running, such as in the form of a background application, accessing the client device 110(3) may result in continued execution of the experiment state 102(1). In some implementations, the cache of one or more client devices 110 may be reset, or the assigned experiment states 102 can be pushed to the client devices 110, independent of the introduction of latency. Resetting the cache or providing the assigned experiment state 102 prior to generation of response data 116 by the client device 110 may minimize the possibility of execution of an outdated experiment state 102. FIG. 1 also depicts one or more additional client devices 110(N) executing one or more additional experiment states 102(N), where N represents any integer value.

Response data 116 may be received from one or more of the client devices 110. The response data 116 may include an identifier of the respective client device 110 providing the response data 116 and an identifier associated with the experiment state 102 that was executed by the client device 110. For example, response data 116 from the client device 110(1) may include an identifier associated with the client device 110(1) or with a communication session established between the client device 110(1) and the server(s) 112. The response data 116 from the client device 110(1) may also include an indication that the client device 110(1) executed the experiment state 102(1), to which a user associated therewith responded. This indication may include a state identifier associated with the experiment state 102(1). A different state identifier may be associated with the experiment state 102(2), such that response data 116 indicating execution of the experiment state 102(2) may be readily differentiated from response data 116 indicating execution of the experiment state 102(1). Similarly, the response data 116 received from the client device 110(2) and the client device 110(3) may include identifiers of the client devices 110 and an indication of the experiment states 102 that were executed.

A validation module 118 in the server(s) 112 may be used to receive the response data 116 and compare the state identifier in the received response data 116 for one or more client devices 110 to the expected experiment state 102 indicated in the assignment data 108 associated with the one or more client devices 110. The validation module 118 may further generate statistical data 120 indicating one or more of the following: allocation matches 122(1) where the experiment state 102(1) was assigned and executed, allocation matches 122(2) where the experiment state 102(2) was assigned and executed, or allocation mismatches 124 where one of the experiment states 102(1) or 102(2) was assigned but the other experiment state 102 was executed. In some implementations, the statistical data 120 may indicate allocation mismatches 124 corresponding to client devices 110 to which the experiment state 102(1) was assigned. In other implementations, the statistical data 120 may indicate allocation mismatches 124 corresponding to client devices 110 to which the experiment state 102(2) was assigned.

The statistical data 120 may be provided to the experimenter device(s) 106, which may output the statistical data 120. In the depicted implementation, in the absence of the separation of allocation mismatches 124 from the remaining response data 116, the response data 116 would include a selection bias favoring the experiment state 102(1). This selection bias may occur, for example, due to the presence of cached content or currently-running applications on one or more client devices 110. The selection bias may also occur due to the failure to provide assigned experiment states 102 to one or more client devices 110. For example, the allocation data 104 may indicate an allocation of experiment states 102 for which the expected response data 116 would include 50% of the client devices 110 executing the first experiment state 102(1) and 50% of the client devices 110 executing the second experiment state 102(2). Due to the selection bias created by allocation mismatches 124, the response data 116 would indicate an unequal distribution between the experiment states 102, potentially rendering the response data 116 statistically invalid. By separating the allocation mismatches 124 from the remainder of the response data 116, the statistical data 120 may indicate a generally equal distribution between allocation matches 122 corresponding to the experiment states 102. Separation of the allocation mismatches 124 from the remainder of the response data 116 may thereby convert statistically invalid data into statistically valid data.

Figure 2:
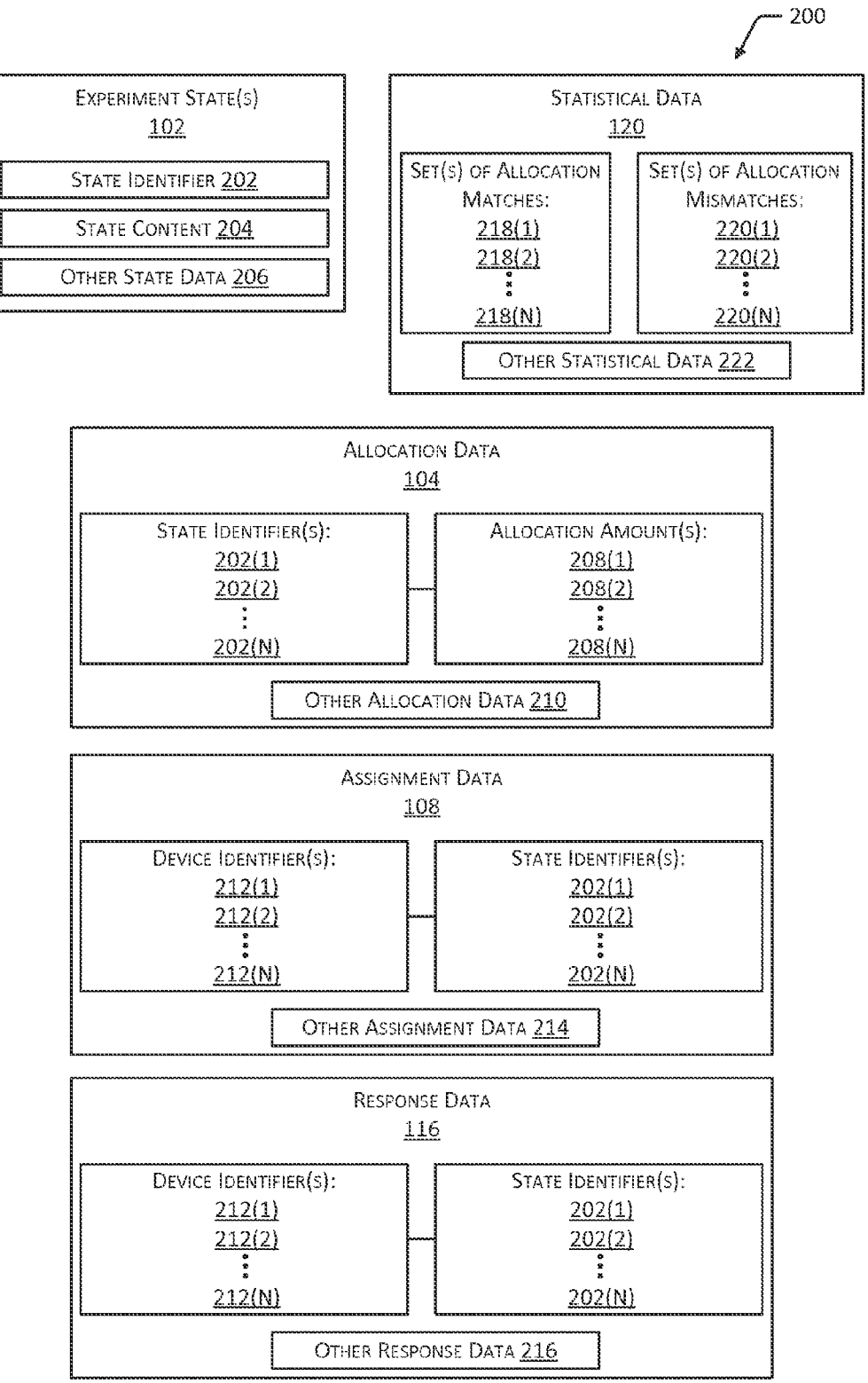
FIG. 2 is a block diagram illustrating examples of data corresponding to experiment states, allocation data, assignment data, response data, and statistical data that may be used to perform a statistical hypothesis experiment and determine the statistical validity of obtained data.

FIG. 2 is a block diagram 200 illustrating example implementations of the data corresponding to experiment states 102, allocation data 104, assignment data 108, response data 116, and statistical data 120 that may be used with the system 100 shown in FIG. 1.

One or more experiment states 102 may include a state identifier 202 and state content 204. A state identifier 202 may be unique to the respective experiment state 102 to which it is associated and may include any manner of data, including an alphanumeric string, image data, video data, audio data, and so forth. For example, a state identifier 202 may include a name or other characteristic of the associated experiment state 102 provided by a user. In some implementations, a state identifier 202 may include a unique identifier recognizable by a computing device, which is not necessarily recognizable by a user. State identifiers 202 may be used as indicators of an experiment state 102 that is assigned to and executed by one or more client devices 110. For example, storage of a state identifier 202 as an indication of an experiment state 102 may reduce or eliminate the need to provide and store experiment states 102 themselves when providing or receiving allocation data 104, assignment data 108, or response data 116.

The state content 204 associated with an experiment state 102 may include any manner of visible, audible, or tactile content perceivable by a user as part of a user experience. For example, state content 204 may include the type or arrangement of text, images, videos, audio elements, vibration, and so forth. The state content 204 may be part of a website, an application, or any other manner of user experience presented to one or more users via a client device 110. Generally, at least a portion of the state content 204 corresponding to an experiment state 102(1) may differ from state content 204 corresponding to experiment state 102(2), such that variations of the user responses to both variants of the state content 204 that differ between experiment states 102 may be determined. Experiment states 102 may differ by variation of a single feature or multiple features. In some implementations, two experiment states 102 may include identical state content 204 while having differing state identifiers 202. For example, to facilitate identification of mismatches caused by cached content or stale experiment states 102, an existing experiment state 102 may be replaced by a substitute version of that experiment state 102 having identical state content 204 but a different state identifier 202. The subsequent receipt of response data 116 indicating that the original existing experiment state 102 was executed may indicate allocation mismatches due to cached content or stale experiment states 102.

Other state data 206 may include elements used to modify the output of the state content 204 based on the nature of the client device 110 and the capabilities thereof, a version identifier associated with the current version of the experiment state 102, a timestamp indicating the date or time at which state content 204 associated with an experiment state 102 was executed, and so forth. Other state data 206 may include an indication of the experiment state 102 assigned to a client device 110. For example, if multiple experiment states 102 are provided to or stored in association with a client device 110, an indication regarding which of the experiment states 102 to execute when accessed by a user may be provided to the client device 110 and stored as other state data 206.

Allocation data 104 may include one or more state identifiers 202, at least a subset of which may be associated with a corresponding allocation amount 208. For example, a first state identifier 202(1) may be associated with a first allocation amount 208(1), a second state identifier 202(2) may be associated with a second allocation amount 208(2), and so forth. The allocation amounts 208 may include fixed or relative quantities associated with one or more state identifiers 202. For example, a first allocation 208(1) amount of 50% may be associated with a state identifier 202(1), and a second allocation amount 208(2) of 50% may be associated with a state identifier 202(2). From this allocation data 104, assignment data 108 may be generated. The assignment data 108 may include indications of assignment of a first experiment state 102(1) to 50% of a set of client devices 110, and assignment of a second experiment state 102(2) to the remaining 50% of the set of client devices 110. In other implementations, the allocation amounts 208 may include unequal distributions of experiment states 102 among client devices 110, numerical quantities of client devices 110 in lieu of percentages or ratios, and so forth.

Other allocation data 210 may include a total number of client devices 110, constraints regarding a minimum or maximum allocation amount 208 that may be associated with one or more of the state identifiers 202, constraints regarding certain client devices 110 or types of client devices 110 that may not receive certain experiment states 102 or that must be provided with certain experiment states 102 based on experiment parameters, and so forth.

Assignment data 108 may include one or more device identifiers 212, at least a subset of which may be associated with one or more of the state identifiers 202. The device identifier(s) 212 may include any manner of name, address (e.g., Machine Access Control (MAC) address or Internet Protocol (IP) address), or other identifier usable to differentiate one client device 110 from other client devices 110. In some implementations, the device identifier(s) 212 may include a session identifier corresponding to a communication session between the client device 110 and the server(s) 112 or other computing devices. In some implementations, a device identifier 212 may include a unique identifier recognizable by a computing device that is not necessarily recognizable by a user.

At least a subset of the device identifiers 212 may be stored in association with a corresponding state identifier 202. For example, a first device identifier 212(1) corresponding to a client device 110(1) may be associated with a state identifier 202(1) corresponding to a first experiment state 102(1). A second device identifier 212(2) corresponding to a client device 110(2) may be associated with a state identifier 202(2) corresponding to a second experiment state 102(2). The assignment data 108 may thereby serve as a log or record of one or more client devices 110, represented by device identifiers 212, and the experiment state 102 assigned to at least a subset of the client devices 110, represented by the corresponding state identifier 202. Assignment of an experiment state 102 to a client device 110 may cause execution of content associated with the assigned experiment state 102 when the client device 110 is accessed by a user. For example, execution of an experiment state 102 may cause presentation of one or more features of a user experience to a user. Response data 116 may be received from a client device associated with the user indicating the experiment state 102 that was executed. The assignment data 108 may be compared to response data 116 received from one or more client devices 110 to determine whether the assigned experiment states 102 were executed by the client devices 110 or whether one or more allocation mismatches 124 occurred.

Other assignment data 214 may include a total number of client devices 110, a total number of experiment states 102, a status of one or more of the client devices 110, constraints regarding certain client devices 110 or types of client devices 110 that may not receive certain experiment states 102 or that must be provided with certain experiment states 102 based on experiment parameters, and so forth.

Response data 116 received from one or more client devices 110 may include one or more of the device identifiers 212, at least a subset of which may be associated with one or more of the state identifiers 202. For example, response data 116 received from a respective client device 110 may include the device identifier 212 associated with that client device 110 and the state identifier 202 associated with the experiment state 102 executed by that client device 110.

The validation module 118 may compare the received response data 116 to the stored assignment data 108 to determine allocation matches 122, allocation mismatches 124, and generate statistical data 120. For example, an allocation match 122 may be determined if a state identifier 202 associated with a respective device identifier 212 in the assignment data 108 matches the state identifier 202 associated with the respective device identifier 212 in the response data 116. An allocation mismatch 124 may be determined if the state identifier 202 in the received response data 116 does not match the state identifier 202 in the assignment data 108 associated with a respective device identifier 212.

Other response data 216 may include other information received from one or more client devices 110, such as a status of a client device 110, one or more hardware or software elements associated with the client device 110, a user response to an experiment state 102 executed on the client device 110, and so forth. For example, a user response may include an indication of a conversion or other type of positive or negative interaction with content associated with an experiment state 102. Continuing the example, one of the experiment states 102 of a statistical hypothesis experiment may be intended to increase a number of user views, a length of time spent viewing a user experience, a user interaction with an element (e.g., selecting the element using a mouse or similar input device), purchase of an item by a user, and so forth. Other response data 216 may include the interaction of the user with the executed experiment state 102.

The statistical data 120 may include one or more sets of allocation matches 218 and one or more sets of allocation mismatches 220. As described previously, the response data 116 may be compared with the assignment data 108 to determine whether state identifiers 202 received from client devices 110 as response data 116 match state identifiers 202 associated with experiment states 102 assigned to the client devices 110. Instances where a state identifier 202 of the assignment data 108 matches a corresponding state identifier 202 of the response data 116 may be determined as an allocation match 122. Instances where the state identifier 202 of the assignment data 108 does not match the corresponding state identifier 202 of the response data 116 may be determined as an allocation mismatch 124. The statistical data 120 may include sets of allocation matches 218 and sets of allocation mismatches 220. For example, a first set of allocation matches 218(1) may include a quantity or relative quantity (e.g., a percentage or ratio) of allocation matches 122 corresponding to assignment and execution of an experiment state 102(1). Continuing the example, a second set of allocation matches 218(2) may include a quantity or relative quantity of allocation matches 122 corresponding to assignment and execution of an experiment state 102(2). A set of allocation mismatches 220(1) may include a quantity or relative quantity of allocation mismatches 124 corresponding to assignment of an experiment state 102(1) and execution of a different experiment state 102. A set of allocation mismatches 220(2) may include a quantity or relative quantity of allocation mismatches 124 corresponding to assignment of an experiment state 102(2) and execution of a different experiment state 102.

In some implementations, the allocation mismatches 124 may be divided into sets of allocation mismatches 220 based on both the experiment state 102 that was assigned and the experiment state 102 that was executed by a client device 110. For example, when performing a statistical hypothesis experiment in which three or more experiment states 102 exist, sets of allocation mismatches 220 may correspond to assignment of a first experiment state 102(1) and execution of a second experiment state 102(2), assignment of the first experiment state 102(1) and execution of a third experiment state 102(3), assignment of the second experiment state 102(2) and execution of the first experiment state 102(1), assignment of the second experiment state 102(2) and execution of the third experiment state 102(3), and so forth. Continuing the example, in a statistical hypothesis experiment, a substitute version of a preexisting experiment state 102 may be used to replace the preexisting experiment state 102. In some instances, the preexisting experiment state 102 may be executed on one or more client devices 110, due to the existence of cached content, a currently running application, and so forth. Allocation mismatches 124 relating to the preexisting experiment state 102 may be separated into sets of allocation mismatches 220 corresponding to assignment of the substitute version and execution of the preexisting experiment state 102, and assignment of an additional experiment state 102 and execution of the preexisting experiment state 102. Allocation mismatches 124 may further be separated into sets of allocation mismatches 220 corresponding to assignment of the substitute version of the preexisting experiment state 102 and execution of the additional experiment state 102, and vice versa. Allocation mismatches 124 relating to assignment of the substitute experiment state 102 and a response indicating the additional experiment state 102, or assignment of the additional experiment state 102 and response of the substitute experiment state 102 may be caused by errors in experimental parameters unrelated to cached content or currently running applications.

Other statistical data 222 may include other criteria by which allocation matches 122 or allocation mismatches 124 may be separated into related sets, such as types of client devices 110 to which experiment states 102 are provided, user demographics, and so forth.

Figure 3:
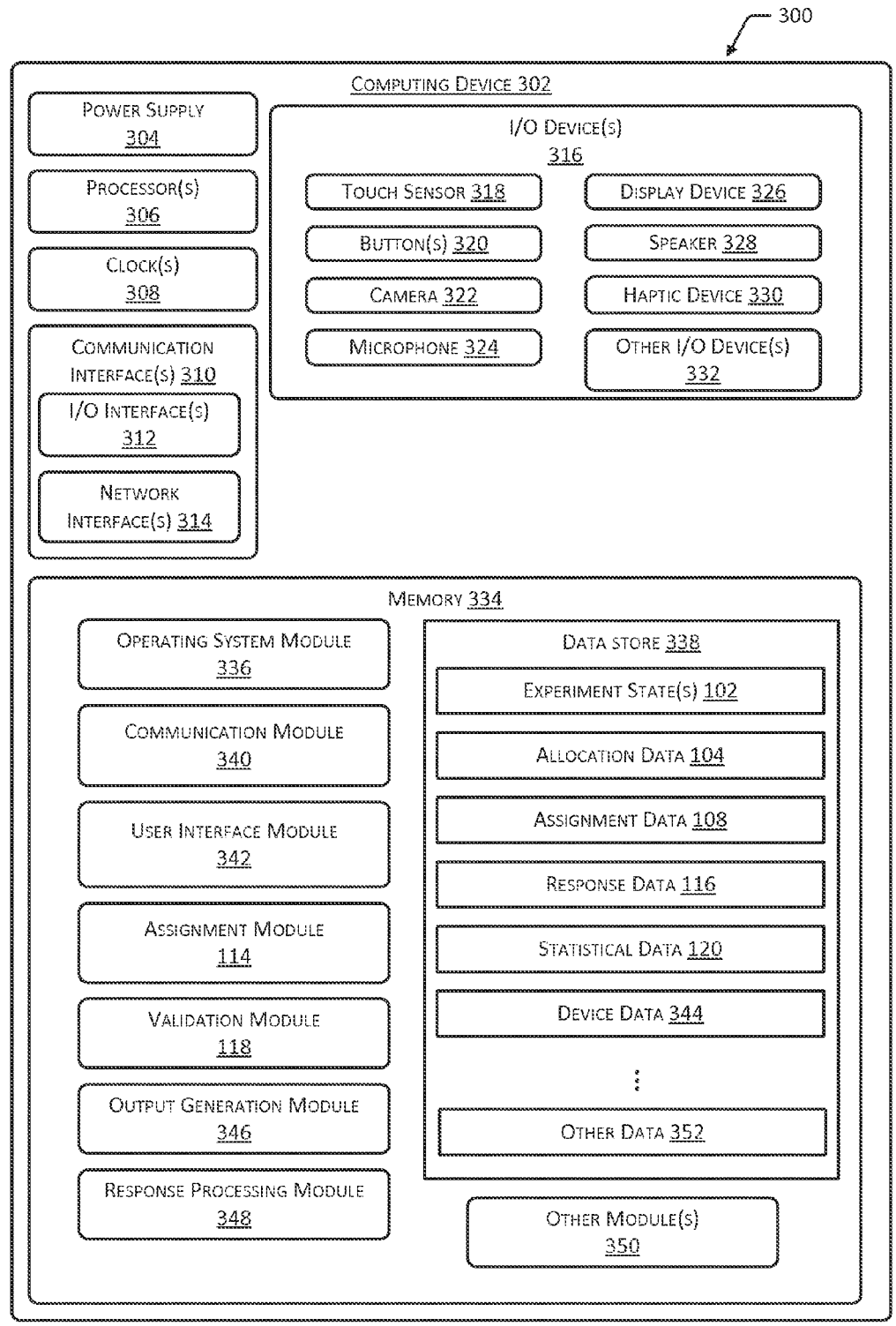
FIG. 3 is a block diagram illustrating a computing device within the scope of the present disclosure.

FIG. 3 illustrates a block diagram 300 of a computing device 302 configured to support operation of the system 100. The computing device 302 may include, but is not limited to, one or more servers 112, client devices 110, experimenter devices 106, or other computing devices 302 in communication with the servers 112, client devices 110, experimenter devices 106, or other computing devices 302.

One or more power supplies 304 may be configured to provide electrical power suitable for operating the components in the computing device 302. In some implementations, the power supply 304 may include a rechargeable battery, fuel cell, photovoltaic cell, power conditioning circuitry, and so forth.

The computing device 302 may include one or more hardware processor(s) 306 (processors) configured to execute one or more stored instructions. The processor(s) 306 may include one or more cores. One or more clocks 308 may provide information indicative of date, time, ticks, and so forth. For example, the processor(s) 306 may use data from the clock 308 to generate a timestamp, trigger a preprogrammed action, and so forth.

The computing device 302 may include one or more communication interfaces 310 such as input/output (I/O) interfaces 312, network interfaces 314, and so forth. The communication interfaces 310 may enable the computing device 302, or components thereof, to communicate with other devices or components. The I/O interfaces 312 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 312 may couple to one or more I/O devices 316. The I/O devices 316 may include any manner of input device or output device associated with a client device 110, server 112, experimenter device 106, or other computing device 302 associated therewith. The I/O devices 316 may include input devices such as a touch sensor 318, one or more buttons 320, a camera 322, a microphone 324, and so forth. Buttons 320 may include, for example, buttons 320 of a keyboard or mouse. The I/O devices 316 may also include output devices such as a display device 326, a speaker 328, one or more haptic devices 330, and so forth. Other I/O devices 332, such as motion or orientation sensors, location sensors, light sensors, printers, scanners, a keyboard, a mouse, and so forth, may also be present. In some implementations, the I/O devices 316 may be physically incorporated with the computing device 302 or may be externally placed.

The network interfaces 314 may be configured to provide communications between the computing device 302 and other devices, such as the I/O devices 316, routers, access points, and so forth. The network interfaces 314 may include devices configured to couple to one or more networks including local area networks (LANs), wireless LANs, wide area networks (WANs), wireless WANs, and so forth. For example, the network interfaces 314 may include devices compatible with Ethernet, Wi-Fi™, Bluetooth®, ZigBee®, Z-Wave, 3G, 4G, LTE, and so forth.

The computing device 302 may include one or more busses or other internal communications hardware or software that allows for the transfer of data between the various modules and components of the computing device 302.

As shown in FIG. 3, the computing device 302 may include one or more memories 334. The memory 334 may include one or more computer readable storage media (CRSM). The CRSM may be any one or more of an electronic storage medium, a magnetic storage medium, an optical storage medium, a quantum storage medium, a mechanical computer storage medium, and so forth. The memory 334 may provide storage of computer-readable instructions, data structures, program modules, and other data for the operation of the computing device 302. A few example modules are shown stored in the memory 334, although the same functionality may alternatively be implemented in hardware, firmware, or as a system on a chip (SOC).

The memory 334 may include one or more operating system (OS) modules 336. The OS module 336 may be configured to manage hardware resource devices such as the I/O interfaces 312, the network interfaces 314, the I/O devices 316, and to provide various services to applications or modules executing on the processors 306. The OS module 336 may implement a variant of the FreeBSD™ operating system as promulgated by the FreeBSD Project; UNIX™ or a UNIX-like operating system; a variation of the Linux™ operating system as promulgated by Linus Torvalds; the Windows® operating system from Microsoft Corporation of Redmond, Wash., USA; or other operating systems.

A data store 338 and one or more of the following modules may also be stored in the memory 334. The modules may be executed as foreground applications, background tasks, daemons, and so forth. The data store 338 may use a flat file, database, linked list, tree, executable code, script, or other data structure to store information. In some implementations, the data store 338 or a portion of the data store 338 may be distributed across one or more other devices including the computing devices 302, network attached storage devices, and so forth.

A communication module 340 may be configured to establish communications with one or more of other computing devices 302, such as client devices 110, servers 112, experimenter devices 106, remote CRSM, and so forth. The communications may be authenticated, encrypted, and so forth.

The memory 334 may also store a user interface module 342. The user interface module 342 may be configured to provide one or more interfaces by which a user may interact with a computing device 302, such as a server 112, client device 110, an experimenter device 106, and so forth. For example, the user interface module 342 may provide an interface to an experimenter device 106 by which a user may provide experiment states 102, allocation data 104, and so forth.

The memory 334 may also store the assignment module 114. The assignment module 114 may be configured to query device data 344, which may include, for example, device identifiers 212 associated with a plurality of client devices 110 in communication with the computing device 302. The assignment module 114 may assign at least one experiment state 102 to at least a subset of the client devices 110. The assignment module 114 may further store one or more device identifiers 212 in association with a state identifier 202 that corresponds to the experiment state 102 assigned to the respective client device 110. When additional client devices 110 access the computing device 302 or otherwise become available to participate in a statistical hypothesis experiment, the assignment module 114 may assign at least one experiment state 102 to one or more of the additional client devices 110 in the same manner. The allocation data 104 may be used to determine which experiment state 102 is assigned to one or more of the additional client devices 110. In some implementations, the assignment module 114 may be used to access allocation data 104, state identifiers 202 associated with the experiment states 102, and device identifiers 212 associated with client devices 110, to generate the assignment data 109.

The memory 334 is also depicted as having the validation module 118 stored therein. The validation module 118 may be configured to access response data 116 and the assignment data 108 to compare state identifiers 202 in the response data 116 to state identifiers 202 in the assignment data 108 for respective client devices 110. For example, the response data 116 received from a respective client device 110 may include a device identifier 212 associated with that client device 110 and a state identifier 202 associated with an experiment state 102. The assignment data 108 corresponding to the respective client device 110 may include the device identifier 212 for that client device 110, and a state identifier 202. If the state identifiers 202 for that client device 110 within the response data 116 and the assignment data 108 are identical, the validation module 118 may determine an allocation match 122 corresponding to the experiment state 102 associated with the state identifier 202. If the state identifiers 202 within the response data 116 and the assignment data 108 are not identical, the validation module 118 may determine an allocation mismatch 124. In some implementations, the allocation mismatch 124 may be identified by the experiment state 102 assigned to the respective client device 110, the experiment state 102 executed by the client device 110, or both the experiment state 102 assigned to the respective client device 110 and the experiment state 102 executed by the client device 110. In other implementations, the allocation mismatch 124 may be separately recorded from the allocation matches 122, but the allocation mismatch 124 may not necessarily be separated from the other allocation mismatches 124. The validation module 118 may further generate statistical data 120 indicating one or more of the following: sets of allocation matches 218 corresponding to experiment states 102 and sets of allocation mismatches 220.

The memory 334 is further depicted having an output generation module 346 stored therein. The output generation module 346 may be configured to present the statistical data 120 in one or multiple arrangements, as output to a computing device 302, such as the experimenter device 106. The output statistical data 120 may include an indication of sets of allocation matches 218 corresponding to experiment states 102 and sets of allocation mismatches 220. The sets of allocation mismatches 220 may be separated into subsets, which may correspond to one or more of an experiment state 102 assigned to a client device 110 or an experiment state 102 executed by a client device 110. Output provided to a computing device 302 may further include other response data 216, such as user conversions or interactions with experiment states 102. A response processing module 348 may be used to determine user interactions with experiment states 102 and generate output that includes indications of user interactions, such as a conversion rate for one or more experiment states 102.

Other modules 350 may also be present in the memory 334. For example, video or audio processing modules may be used to process, store, and transmit video or audio elements of experiment states 102. Data scrubbing modules may be used to anonymize response data 116 received from various client devices 110. Encryption modules may be used to encrypt and decrypt communications between computing devices 302. Other modules 350 may further include a PRNG or similar types of modules for assigning experiment states 102 to client devices 110 in a random or pseudo-random manner. Other data 352 may include user data, such as demographic information. For example, the demographic information may be used to select specific users and corresponding client devices 110 for participation in a statistical hypothesis experiment based on various characteristics of users, such as age, sex, purchase history, and so forth.

In different implementations, different computing devices 302 may have different capabilities or capacities. For example, the server(s) 112 may have significantly more processor 306 capability and memory 334 capacity compared to the experimenter device(s) 106 or the client devices 110.

Figure 4:
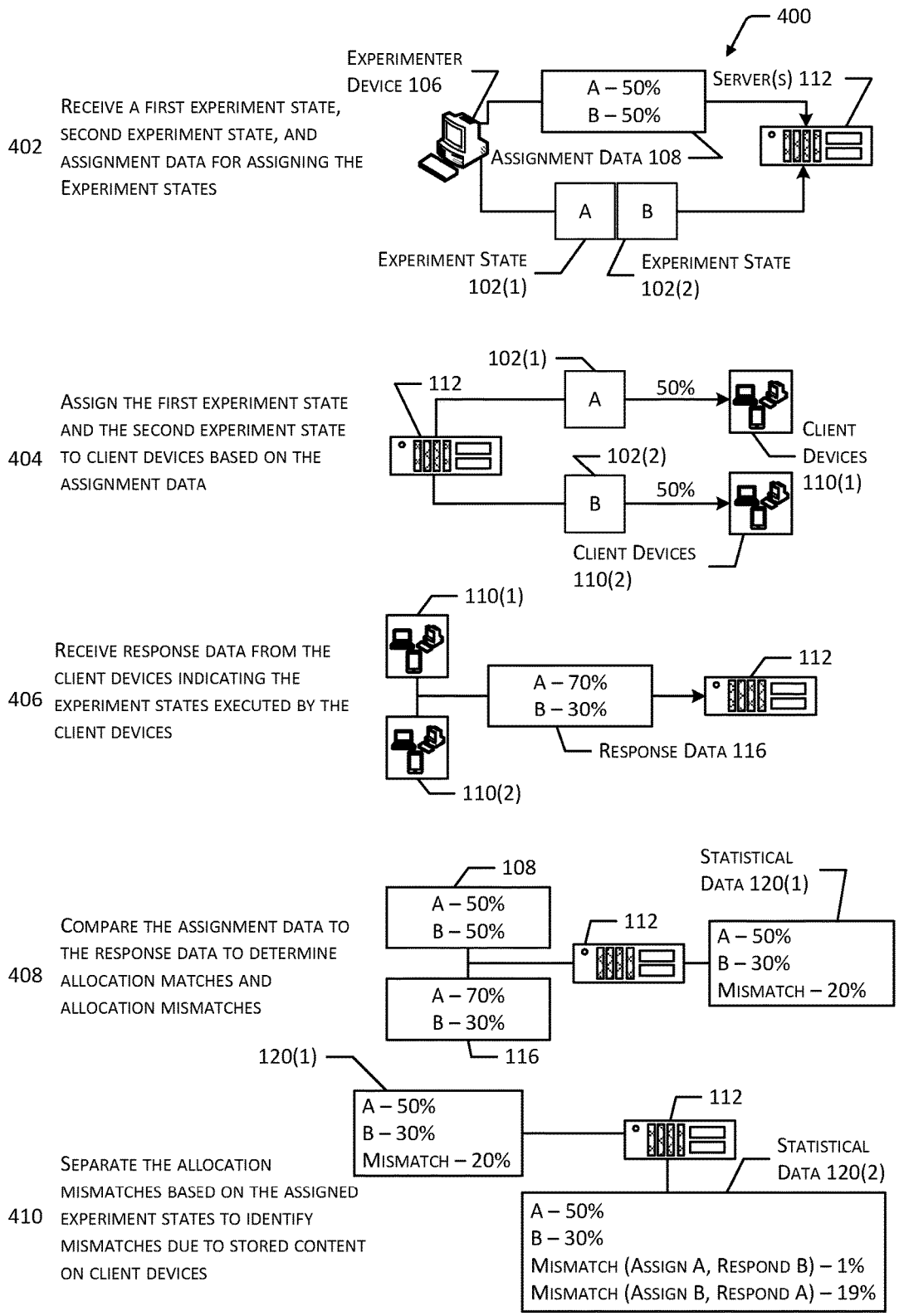
FIG. 4 illustrates a scenario for assigning experiment states to client devices, receiving response data, and identifying allocation matches and allocation mismatches in the response data.

FIG. 4 depicts a scenario 400 for assigning experiment states 102 to client devices 110 and identifying allocation mismatches 124 in response data 116 received from the client devices 110. At 402, one or more experiment states 102(1) and 102(2) are received by one or more servers 112 from an experimenter device 106. Assignment data 108 for assigning the experiment states 102(1) and 102(2) may also be received. In the depicted scenario 400, the assignment data 108 includes an equal distribution of the experiment states 102(1) and 102(2), such that 50% of client devices 110 will be assigned the experiment state 102(1), and the other 50% of client devices 110 will be assigned the experiment state 102(2).

At 404, the experiment states 102(1) and 102(2) are assigned to client devices 110 based on the assignment data 108. Specifically, FIG. 4 depicts the server(s) 112 providing the experiment state 102(1) to a first subset of client devices 110(1), representing 50% of a set of client devices 110. The server(s) 112 are also depicted providing the experiment state 102(2) to a second subset of client devices 110(2), representing the other 50% of the set of client devices 110. Assignment of experiment states 102 to client devices 110 may be performed in a random or pseudo-random manner. The number of client devices 110 may be fixed or dynamic. As additional client devices 110 become available to participate in the statistical hypothesis experiment, experiment states 102 may be assigned to the additional client devices 110. Assignments of experiment states 102 to additional client devices 110 may be determined based on the current distribution of experiment states 102 among the client devices 110 or on allocation data 104 used to generate the assignment data 108. For example, if 10% of the client devices 110 to which the experiment state 102(1) was assigned become inactive, an equal number of additional client devices 110 may be assigned the experiment state 102(1) until the distribution of experiment states 102 among client devices 110 matches the distribution indicated in the allocation data 104. In some implementations, new assignments of experiment states 102 to client devices 110 may be provided based on the allocation data 104, replacing previous assignments.

At 406, response data 116 is received from the client devices 110 indicating the experiment states 102 that were executed by the client devices 110. For example, while the assignment data 108 may be used to determine the experiment state 102 that is assigned to a respective client device 110, in some cases, stored content on a client device 110 relating to a different experiment state 102 may be present. Continuing the example, a client device 110 may include a preexisting experiment state 102 thereon, as cached content or as currently-running content. When the client device 110 is accessed by a user, the preexisting experiment state 102 may be executed in lieu of the experiment state 102 assigned to the client device 110, resulting in response data 116 that does not match the assignment data 108. In the depicted scenario 400, the response data 116 provided from the client devices 110 to the server(s) 112 indicates that the experiment state 102(1) was executed by 70% of the client devices 110 and the experiment state 102(2) was executed by 30% of the client devices 110.

At 408, the assignment data 108 and the response data 116 are compared to determine allocation matches 122 and allocation mismatches 124. For example, the validation module 118 may be used to determine a state identifier 202 associated with a respective device identifier 212 in the allocation data 104. Continuing the example, the validation module 118 may also be used to determine a state identifier 202 associated with the same respective device identifier 212 in the response data 116. If the state identifier 202 in the assignment data 108 matches the state identifier 202 in the response data 116, an allocation match 122 corresponding to the experiment state 102 associated with the state identifier 202 may be determined. If the state identifier 202 in the allocation data 104 does not match the state identifier 202 in the response data 116, an allocation mismatch 124 may be determined. From the allocation matches 122 and allocation mismatches 124, statistical data 120 may be generated. In the depicted scenario 400, first statistical data 120(1) indicates that 50% of the client devices 110 received and executed the experiment state 102(1), 30% of the client devices 110 received and executed the experiment state 102(2), and 20% of the client devices 110 executed a different experiment state 102 than the experiment state 102 assigned.

While one or more of the allocation mismatches 124 may be caused by the presence of cached content or a currently-running application, as described previously, one or more of the allocation mismatches 124 may also be caused by errors in other experiment parameters. At 410, the allocation mismatches 124 are separated based on the assigned experiment states 102 to identify mismatches 124 due to stored content on client devices 110. Allocation mismatches 124 in which a preexisting experiment state 102 was executed and a different experiment state 102 was assigned most likely occurred due to preexisting content on a client device 110. Conversely, allocation mismatches 124 in which the experiment state 102 that was executed by a client device 110 does not correspond to stored content on the client device 110 most likely occurred due to errors in one or more other experiment parameters. For example, the depicted scenario 400 illustrates the server(s) 112 acting on the statistical data 120(1) to produce second statistical data 120(2). The statistical data 120(2) indicates that 50% of the client devices 110 received and executed the experiment state 102(1), 30% of the client devices 110 received and executed the experiment state 102(2), 1% of the client devices 110 were assigned the experiment state 102(1) and experiment the feature state 102(2), and 19% of the client devices 110 were assigned the experiment state 102(2) and executed the experiment state 102(1).

In the depicted scenario 400, the experiment state 102(1) may represent a preexisting user experience (e.g., a control state), having preexisting content stored on one or more client devices 110, while the experiment state 102(2) may represent a variation in the preexisting user experience (e.g., a treatment state). As such, a majority of the depicted allocation mismatches 124 correspond to assignment of the experiment state 102(2) and execution of the experiment state 102(1), which may occur due to the execution of preexisting, stored content by one or more of the client devices 110. The allocation mismatches 124 that correspond to assignment of the experiment state 102(1) and execution of the experiment state 102(2) may occur due to errors in other experiment parameters, such as the manner in which an experiment was initiated or terminated or the manner in which experiment states 102 were allocated or provided to client devices 110. Separating the allocation mismatches 124 based on the assigned or executed experiment states 102 may thereby facilitate identification of potential errors in experiment parameters.

Figure 5:
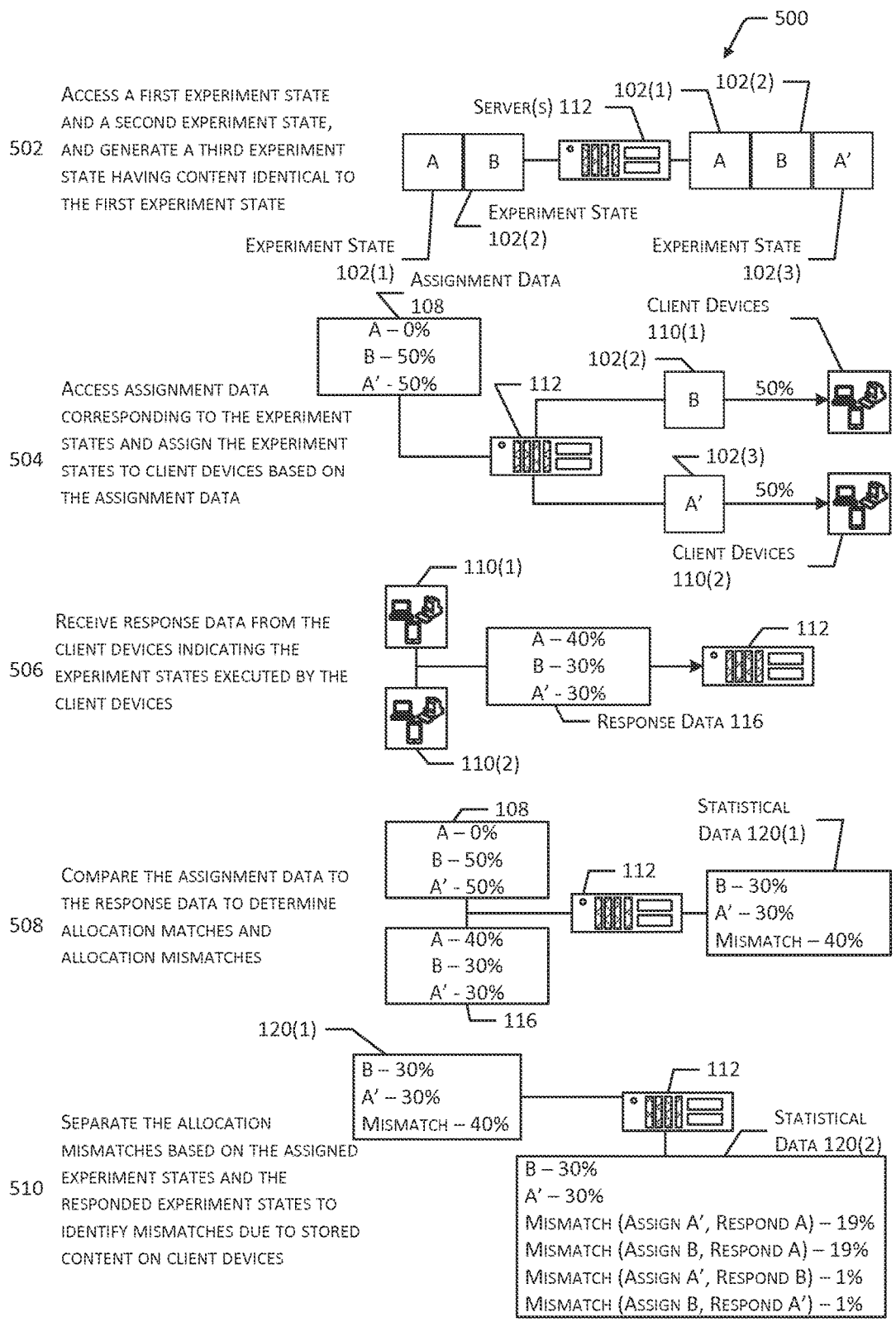
FIG. 5 illustrates a scenario for generating a substitute experiment state to identify allocation mismatches due to cached or stored content in client devices.

FIG. 5 illustrates a scenario 500 for generating a substitute experiment state 102 to identify allocation mismatches 124 due to stored content in client devices 110. At 502, a first experiment state 102(1) and a second experiment state 102(2) are accessed by one or more servers 112. A third experiment state 102(3) is generated, by an experimenter device 106 or the server(s) 112, having state content 204 identical to those of the experiment state 102(1). For example, the experiment state 102(3) may include content that, when executed by a client device 110, presents a user experience on the client device 110 identical to the first experiment state 102(1); however, the experiment state 102(3) may have a different state identifier 202 associated therewith. In the depicted scenario 500, the experiment state 102(1) may represent a preexisting user experience, having preexisting content stored on one or more client devices 110, while the experiment state 102(2) may represent a variation in the preexisting user experience. Generation of an experiment state 102(3) having state content 204 identical to that of the experiment state 102(1) can facilitate isolation of allocation mismatches 124 caused by the presence of stored content associated with the experiment state 102(1) on one or more client devices 110.

At 504, assignment data 108 corresponding to the experiment states 102 is accessed by the server(s) 112, and experiment states 102 are assigned to client devices 110 based on the assignment data 108. Specifically, FIG. 5 depicts the assignment data 108 including an equal distribution of the experiment state 102(2) and the experiment state 102(3), such that 50% of client devices 110 will be assigned the experiment state 102(2) and the other 50% of client devices 110 will be assigned the experiment state 102(3). In the depicted scenario 500, the experiment state 102(1) is not assigned to any client device 110. The server(s) 112 are shown providing the experiment state 102(2) to a first subset of client devices 110(1), representing 50% of a set of client devices 110. The server(s) 112 are also depicted providing the experiment state 102(3) to a second subset of client devices 110(2), representing the other 50% of the set of client devices 110. Prior to initiating an experiment, accessing the depicted assignment data 108, and providing assigned experiment states 102 to client devices 110, the allocation of experiment states 102 among client devices 110 may include a distribution of the first feature state 102(1) to substantially all of the client devices 110. As such, content corresponding to the first feature state 102(1) may be stored in association with one or more client devices 110 prior to the assignment of the second feature state 102(2) and third feature state 102(3).

At 506, response data 116 is received from the client devices 110, indicating the experiment states 102 executed by the client devices 110. In the depicted scenario 500, the response data 116 provided from the client devices 110 to the server(s) 112 indicates that the experiment state 102(1) was executed by 40% of the client devices 110, the experiment state 102(2) was executed by 30% of the client devices 110, and the experiment state 102(3) was executed by 30% of the client devices 110. Because the experiment state 102(1) was not assigned to a client device 110, instances where the experiment state 102(1) was executed by a client device 110 may be determined to be allocation mismatches 124.

At 508, the assignment data 108 and the response data 116 are compared to determine allocation matches 122 and allocation mismatches 124. For example, as described previously, the validation module 118 may be used to determine state identifiers 202 associated with a respective device identifier 212 in the assignment data 108 and response data 116. The validation module 118 may also be used to compare the state identifiers 202 with one another. In some implementations, execution of the first experiment state 102(1) by a client device 110 may be determined to be an allocation mismatch 124 in the absence of a comparison due to the fact that the experiment state 102(1) was not assigned to a client device 110. From the allocation matches 122 and allocation mismatches 124, statistical data 120 may be generated. In the depicted scenario 500, statistical data 120(1) indicates that 30% of the client devices 110 received and executed the second experiment state 102(2), 30% of the client devices 110 received and executed the third experiment state 102(3), and 40% of the client devices 110 executed a different experiment state 102 than the experiment state 102 assigned.

At 510, the allocation mismatches 124 are separated based on the assigned experiment states 102 and the executed experiment states 102, to identify allocation mismatches 124 due to stored content on client devices 110 and allocation mismatches 124 potentially caused by other experiment parameters. Allocation mismatches 124 in which the experiment state 102(1) was executed most likely occurred due to preexisting content on a client device 110. Conversely, allocation mismatches 124 in which the experiment state 102 that was executed by a client device 110 does not correspond to stored content on the client device 110 most likely occurred due to errors in one or more other experiment parameters. For example, the depicted scenario 500 illustrates the server(s) 112 acting on the statistical data 120(1) to produce statistical data 120(2). The statistical data 120(2) indicates that 30% of the client devices 110 received and executed the experiment state 102(2); 30% of the client devices 110 received and executed the experiment state 102(3); 19% of the client devices 110 were assigned the experiment state 102(3) and executed the experiment state 102(1); 19% of the client devices 110 were assigned the experiment state 102(2) and executed the experiment state 102(1); 1% of the client devices 110 were assigned the experiment state 102(3) and executed the experiment state 102(2); and 1% of the client devices 110 were assigned the experiment state 102(2) and executed the experiment state 102(3).

Figure 6:
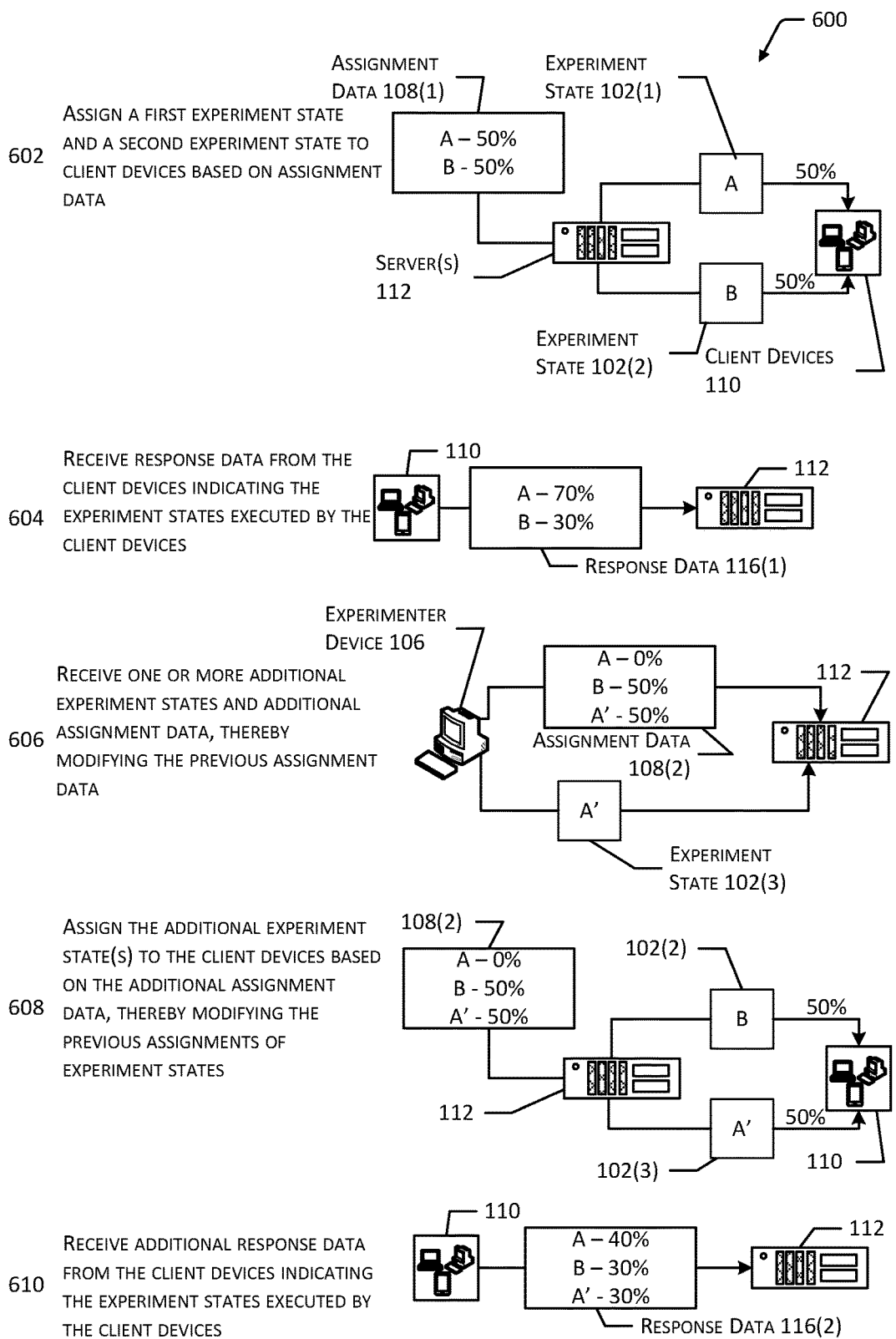
FIG. 6 illustrates a scenario for generating one or more additional experiment states and reassigning experiment states to client devices to replace previous assignments of experiment states.

FIG. 6 illustrates a scenario 600 in which additional experiment states 102 may be received and assigned to client devices 110 to replace previously-assigned experiment states 102. The depicted scenario 600 illustrates that implementations usable within the scope of the present disclosure may enable the addition, removal, replacement, or modification of experiment states 102 as well as the reallocation of one or both assigned experiment states 102 among client devices 110 without interrupting or restarting a statistical hypothesis experiment.

At 602, experiment states 102(1) and 102(2) are assigned to a set of client devices 110 by one or more servers 112 based on assignment data 108(1). In the depicted scenario 600, the assignment data 108(1) indicates an equal distribution between the experiment state 102(1) and the experiment state 102(2). Consequently, FIG. 6 depicts the experiment state 102(1) assigned to 50% of the client devices 110 and the experiment state 102(2) assigned to other 50% of the client devices 110.

At 604, response data 116(1) from the client devices 110 is received by the server(s) 112, indicating the experiment states 102 executed by the client devices 110. The depicted response data 116(1) indicates that the experiment state 102(1) was executed by 70% of the client devices 110 and the experiment state 102(2) was executed by 30% of the client devices 110.

At 606, one or more additional experiment states 102 and additional assignment data 108(2) may be received by the server(s) 112. The additional assignment data 108(2) may replace or modify the previous assignment data 108(1) received by the server(s) 112. Specifically, an experimenter device 106 is shown providing an experiment state 102(3) and additional assignment data 108(2) to the server(s) 112. The additional assignment data 108(2) indicates an equal distribution between the second experiment state 102(2) and the third experiment state 102(3). As depicted in FIG. 6, the experiment state 102(2) is assigned to 50% of the client devices 110 and the experiment state 102(3) is assigned to other 50% of the client devices 110. In the depicted scenario 600, the experiment state 102(1) is not assigned to a client device 110.

At 608, the additional experiment state(s) 102 are assigned to the client devices 110 based on the additional assignment data 108(2). Specifically, the server(s) 112 are shown assigning the experiment state 102(2) to 50% of the client devices 110 and the experiment state 102(3) to the other 50% of the client devices 110. The assignment of experiment states 102 based on the additional assignment data 108(2) may thereby modify or replace the previous assignments of experiment states 102.

At 610, additional response data 116(2) may be received from the client devices 110 indicating the experiment states 102 executed by the client devices 110. For example, FIG. 6 depicts the additional response data 116(2) indicating that 40% of the client devices 110 executed the experiment state 102(1), 30% of the client devices 110 executed the experiment state 102(2), and 30% of the client devices 110 executed the experiment state 102(3).

While FIG. 6 depicts generation of a third experiment state 102(3) to be used in place of the first experiment state 102(1), and a scenario 600 in which the second experiment state 102(2) and third experiment state 102(3) are assigned to client devices 110, in other implementations, both the first experiment state 102(1) and second experiment state 102(2) may be replaced by substitute experiment states 102. For example, a fourth experiment state may be generated to replace the second experiment state 102(2), such that response data 116 indicating a response of either the first experiment state 102(1) or second experiment state 102(2) would be determined to be an allocation mismatch 124.

Figure 7:
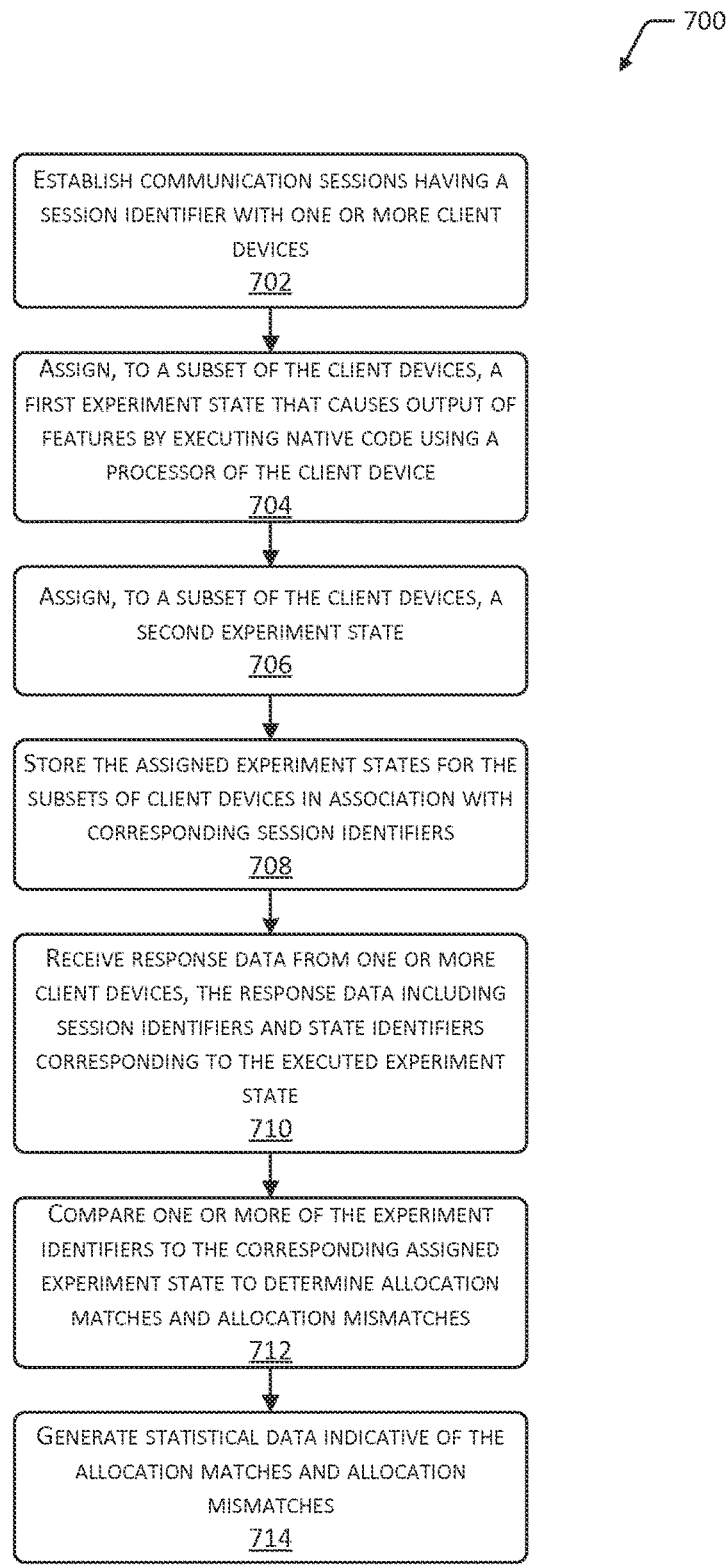
FIG. 7 is a flow diagram illustrating a process for assigning experiment states to client devices, receiving response data, and generating statistical data indicative of allocation matches and allocation mismatches.

FIG. 7 is a flow diagram 700 illustrating a process for assigning experiment states 102 to client devices 110, receiving response data 116, and generating statistical data 120 indicative of allocation matches 122 and allocation mismatches 124. Block 702 establishes communication sessions with one or more client devices 110. One or more of the communication sessions may have a session identifier associated therewith. Session identifiers may be generated or assigned at the time a corresponding session is established. In some implementations, session identifiers may be predefined, such as by including device identifiers 212 corresponding to a respective client device 110.

Block 704 assigns, to a subset of the client devices 110, an experiment state 102(1) that causes output of state content 204 by executing native code using a processor 306 of a client device 110. For example, the experiment state 102(1) may include a native application written and complied for execution by client devices 110. Native applications may be written in a programming language, such as C++ or Objective C, and compiled into native code, such as a binary executable for use on a client device 110. In some implementations, the experiment state 102(1) may include a hybrid application, including both native code and markup language portions. Markup language applications may include one or more instructions in a markup or scripting language which may be rendered by a layout engine or scripting language engine. For example, a markup language may include, but is not limited to, Hypertext Markup Language (HTML), cascading style sheets (CSS), or JavaScript. In some implementations, the markup language application may have multiple instances of the WebView class references.

Block 706 assigns, to a subset of the client devices 110, an experiment state 102(2). The experiment state 102(2) may include a native application, a markup language application, a hybrid application, a browser-based application, or any other type of content that may affect a user experience.

Block 708 stores the assigned experiment states 102 for the subsets of client devices 110 in association with corresponding session identifiers. For example, one or more of the session identifiers may include a state identifier 202 of an experiment state 102 stored in association therewith.

Block 710 receives response data 116 from one or more of the client devices 110. The response data 116 may include session identifiers and state identifiers 202 corresponding to the experiment state 102 executed by a client device 110. For example, the response data 116 may include a state identifier 202 of an experiment state 102 stored in a data store in association with one or more of the session identifiers.

Block 712 compares one or more of the state identifiers 202 in the response data 116 to the corresponding assigned experiment state 102 to determine allocation matches 122 and allocation mismatches 124 in the response data 116. As described previously, if the state identifier 202 received in response data 116 corresponding to a respective client device 110 matches the state identifier 202 corresponding to the experiment state 102 assigned to that client device 110, an allocation match 122 may be determined. If the two state identifiers 202 do not match, an allocation mismatch 124 may be determined.

Block 714 generates statistical data 120 indicative of the allocation matches 122 and allocation mismatches 124. For example, the statistical data 120 may include a table, a graph, or a similar format that may present sets of allocation matches 218 corresponding to an experiment state 102(1), sets of allocation matches 218 corresponding to an experiment state 102(2), and sets of allocation mismatches 220. In some implementations, the sets of allocation mismatches 220 may be separated into subsets based on the experiment states 102 assigned to and executed by various client devices 110.

Figure 8:
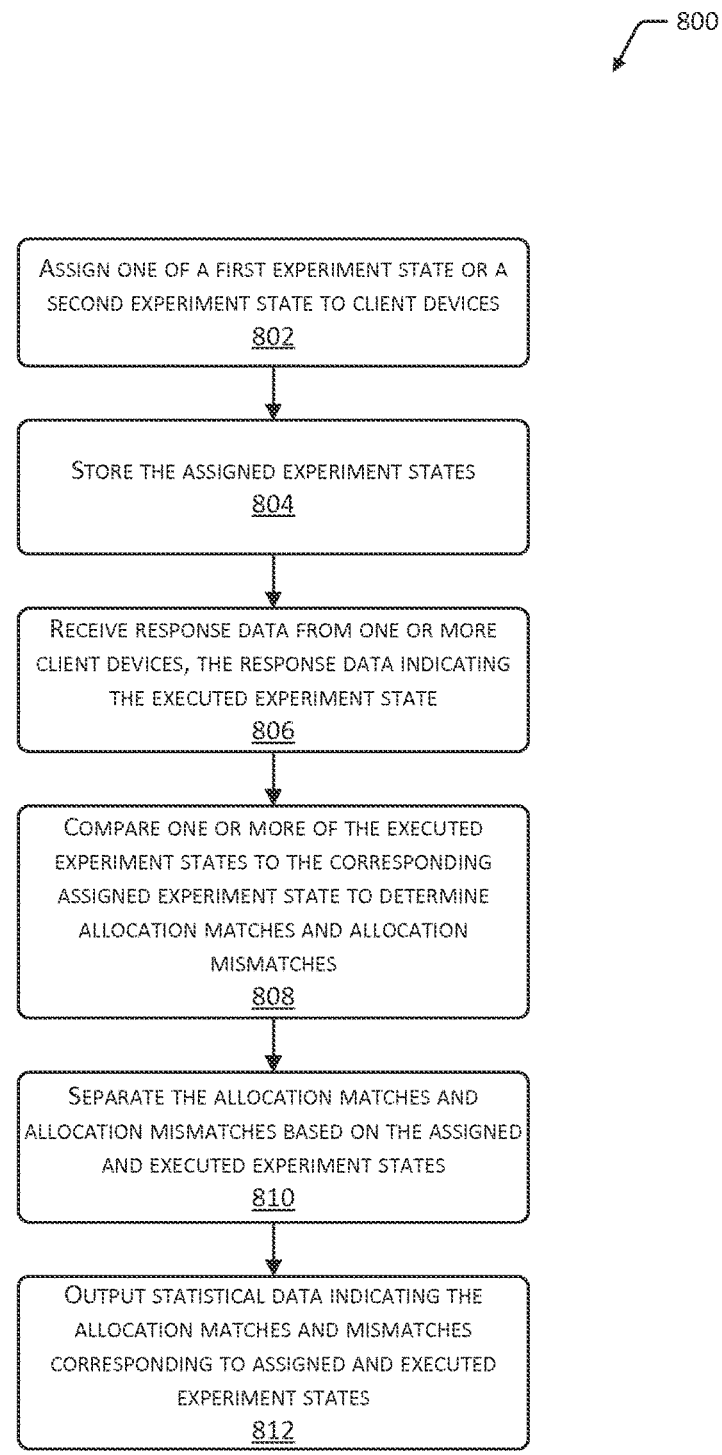
FIG. 8 is a flow diagram illustrating a process for assigning experiment states to client devices, receiving response data, and separating allocation matches and allocation mismatches based on assigned and executed experiment states.

FIG. 8 is a flow diagram 800 illustrating a process for assigning experiment states 102 to client devices 110, receiving response data 116, and separating allocation matches 122 and allocation mismatches 124 based on assigned and executed experiment states 102. Block 802 assigns one of multiple experiment states 102(1) or 102(2) to client devices 110. Assignment of the experiment states 102 may be performed randomly or pseudo-randomly, according to a selected allocation among client devices 110. For example, allocation data 104 including an allocation amount 208 corresponding to one or more experiment states 102 may be accessed. The allocation 104 data may be received from an experimenter device 106, stored on a server 112, and so forth. Experiment states 102 may be assigned to client devices 110 based on the proportions, ratios, quantities, and so forth, indicated in the allocation amounts 208. For example, the allocation data 104 may be used by the experimenter device 106 to generate assignment data 108 including assignments of one or more experiment states 102 to one or more client devices 110. In other implementations, an experimenter device 106 may provide allocation data 104 to one or more servers 112, which may generate the assignment data 108 using the allocation data 104.

Block 804 stores, e.g., on one or more servers 112, the assigned experiment states 102. For example, assignment data 108 may include device identifiers 212 associated with client devices 110. One or more of the device identifiers 212 may have a state identifier 202 stored in association therewith. The state identifier 202 may correspond to the experiment state 102 assigned to the client device 110.

Block 806 receives response data 116 from one or more of the client devices 110. The response data 116 indicates the experiment state 102 executed by the client device 110. For example, the response data 116 may include device identifiers 212 associated with client devices 110. One or more of the device identifiers 212 may have a state identifier 202 stored in association therewith. The state identifier 202 may correspond to the experiment state 102 executed by the client device 110.

Block 808 compares one or more of the executed experiment states 102 to the corresponding assigned experiment states 102 to determine allocation matches 122 and allocation mismatches 124. For example, the assignment data 108 may include a state identifier 202 corresponding to the experiment state 102 assigned to a client device 110. The response data 116 may include a state identifier 202 corresponding to the experiment state 102 executed by the client device 110. If the state identifiers 202 in the assignment data 108 and response data 116 are identical, an allocation match 122 may be determined. If the state identifiers 202 differ, an allocation mismatch 124 may be determined.

Block 810 separates the allocation matches 122 and allocation mismatches 124 based on the assigned and executed experiment states 102. For example, the allocation matches 122 may be separated into a set of allocation matches 218 corresponding to client devices 110 to which an experiment state 102(1) was assigned and executed. The allocation matches 122 may also be separated into a set of allocation matches 218 corresponding to client devices 110 to which an experiment state 102(2) was assigned and executed. The allocation mismatches 124 may be separated into a set of allocation mismatches 220 corresponding to client devices 110 to which an experiment state 102(1) was assigned and an experiment state 102(2) was executed. The allocation mismatches 124 may also be separated into a set of allocation mismatches 220 corresponding to client devices 110 to which an experiment state 102(2) was assigned and an experiment state 102(1) was executed. Block 812 outputs statistical data 120 indicating the allocation matches 122 and allocation mismatches 124 corresponding to the assigned and executed feature states 102.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a server in communication with a plurality of client devices, the server comprising a hardware processor, memory, and computer-executable instructions stored in the memory that, when executed by the hardware processor, cause the hardware processor to:
establish communication sessions with the plurality of client devices, wherein at least a portion of the communication sessions comprise a session identifier;
assign a control state to a first subset of the plurality of client devices and a treatment state to a second subset of the plurality of client devices, wherein at least one of the control state or the treatment state causes output of one or more features by a respective client device by executing native code on the respective client device, further wherein the native code is compiled to execute on a hardware processor of the respective client device;

store assigned experiment states for the first subset and the second subset of the plurality of client devices in association with a respective session identifier;

receive response data from one or more first client devices of the first subset and one or more second client devices of the second subset, wherein the response data comprises session identifiers associated with the one or more first client devices and the one or more second client devices and state identifiers indicative of the output of the control state or the treatment state by the one or more first client devices and the one or more second client devices;

compare at least a subset of the state identifiers to at least a subset of the assigned experiment states to determine a result comprising:
  an allocation match;
  an allocation mismatch associated with assignment of the treatment state and response data associated with the control state; and
  an allocation mismatch associated with assignment of the control state and response data associated with the treatment state;

generate statistical data, using the result, wherein the statistical data is indicative of allocation matches corresponding to the control state and allocation matches corresponding to the treatment state, wherein the statistical data is not indicative of the allocation mismatches associated with assignment of the treatment state and response data associated with the control state and the allocation mismatches associated with assignment of the control state and response data associated with the treatment state; and cause modification of an experiment parameter based at least in part on the allocation mismatches associated with assignment of the control state and response data associated with the treatment state.

2. The system of claim 1, wherein the computer-executable instructions, when executed by the hardware processor, further cause the hardware processor to:
generate an output indicative of the allocation mismatches associated with assignment of the treatment state and response data associated with the control state and the allocation mismatches associated with assignment of the control state and response data associated with the treatment state.

3. The system of claim 1, wherein at least a portion of the response data comprises a state identifier indicative of output of an additional experiment state, other than the treatment state or the control state, by one or more of the plurality of client devices, and
wherein the computer-executable instructions, when executed by the hardware processor, further cause the hardware processor to:
  determine, from the response data, a portion of the allocation mismatches corresponding to an assignment of the control state and the output of the additional experiment state;
  determine, from the response data, a portion of the allocation mismatches corresponding to an assignment of the treatment state and the output of the additional experiment state; and
  generate an output indicative of the allocation mismatches corresponding to the assignment of the control state and the output of the additional experiment state and of the allocation mismatches corresponding to the assignment of the treatment state and the output of the additional experiment state.

4. The system of claim 1, wherein the computer-executable instructions, when executed by the hardware processor, further cause the hardware processor to:
cause modification of the experiment parameter based at least in part on one or more of the statistical data or the allocation mismatches associated with assignment of the treatment state and response data associated with the control state.

5. A method comprising:
assigning a first experiment state comprising a first state identifier to a first subset of a plurality of client devices;
assigning a second experiment state comprising a second state identifier to a second subset of the plurality of client devices;
storing an indication of assigned experiment states for the first subset and the second subset;
receiving response data from the plurality of client devices, wherein the response data comprises at least one indication of the first state identifier and at least one indication of the second state identifier;
determining, from the response data and the assigned experiment states, one or more of:
  at least one allocation match corresponding to assignment of the first experiment state and response of the first experiment state;
  at least one allocation match corresponding to assignment of the second experiment state and response of the second experiment state;
  at least one allocation mismatch corresponding to assignment of the first experiment state and response of the second experiment state; or
  at least one allocation mismatch corresponding to assignment of the second experiment state and response of the first experiment state;
generating statistical data indicative of one or more of:
  the at least one allocation match corresponding to assignment of the first experiment state and response of the first experiment state; or
  the at least one allocation match corresponding to assignment of the second experiment state and response of the second experiment state; and
causing modification of an experiment parameter based at least in part on one or more of:
  the at least one allocation mismatch corresponding to assignment of the first experiment state and response of the second experiment state; or
  the at least one allocation mismatch corresponding to assignment of the second experiment state and response of the first experiment state.

6. The method of claim 5, wherein the second experiment state causes output of one or more features by a respective client device of the plurality of client devices by executing native code on the respective client device, further wherein the native code is compiled to execute on a hardware processor of the respective client device.

7. The method of claim 5, further comprising:
generating a third experiment state comprising a third state identifier and one or more first features associated with the second experiment state;
assigning the third experiment state to the second subset, wherein the indication of assigned experiment states for the second subset indicates the third experiment state;
wherein the response data further comprises indications of the third state identifier;
receiving additional response data from the second subset, wherein the additional response data comprises at least one indication of the first state identifier, at least one indication of the second state identifier, and at least one indication of the third state identifier;

determining, from the response data and the assigned feature states:
- at least one allocation mismatch corresponding to assignment of the first experiment state and response of the third experiment state;

determining, from the additional response data and the additional assigned feature states, one or more of:
- at least one allocation match corresponding to assignment of the third experiment state and response of the third experiment state; or
- at least one allocation mismatch corresponding to assignment of the third experiment state and response of one of: the first experiment state or the second experiment state; and wherein the experiment parameter is further modified based at least in part on one or more of:
- the at least one allocation mismatch corresponding to assignment of the first experiment state and response of the third experiment state;
- the at least one allocation match corresponding to assignment of the third experiment state and response of the third experiment state; or
- the at least one allocation mismatch corresponding to assignment of the third experiment state and response of one of: the first experiment state or the second experiment state.

8. The method of claim 7, wherein assigning the first experiment state to the first subset of the plurality of client devices and assigning the third experiment state to the second subset of the plurality of client devices comprises:
randomly assigning one of the third experiment state or the first experiment state to the first subset of the plurality of client devices and the second subset of the plurality of client devices, wherein at least one client device of the plurality of client devices comprises preexisting content associated with the second experiment state stored thereon.

9. The method of claim 5, wherein the at least one indication of the second state identifier comprise one or more of:
- an indication of cached content associated with the second experiment state stored on at least one client device of the plurality of client devices; or
- an indication of content associated with an application currently being executed by the at least one client device of the plurality of client devices.

10. The method of claim 5, further comprising:
assigning one of the second experiment state or a third experiment state comprising a third state identifier to one or more of the plurality of client devices, thereby generating additional assigned experiment states for the one or more of the plurality of client devices;

receiving additional response data from the one or more of the plurality of client devices, wherein the additional response data comprises indications of the first state identifier, indications of the second state identifier, and indications of the third state identifier;

determining, from the additional response data and the additional assigned feature states one or more of:
- at least one allocation match corresponding to assignment of the second experiment state and response of the second experiment state;
- at least one allocation match corresponding to assignment of the third experiment state and response of the third experiment state;
- at least one allocation mismatch corresponding to assignment of the second experiment state and response of one of: the first experiment state or the third experiment state; or
- at least one allocation mismatch corresponding to assignment of the third experiment state and response of one of: the first experiment state or the second experiment state;

generating additional statistical data indicative of one or more of:
- the at least one allocation match corresponding to assignment of the second experiment state and response of the second experiment state; or
- the at least one allocation match corresponding to assignment of the third experiment state and response of the third experiment state;

wherein the experiment parameter is further modified based at least in part on one or more of:
- the at least one allocation mismatch corresponding to assignment of the second experiment state and response of one of: the first experiment state or the third experiment state; or
- the at least one allocation mismatch corresponding to assignment of the third experiment state and response of one of: the first experiment state or the second experiment state.

11. The method of claim 5, further comprising:
assigning one of a third experiment state comprising a third state identifier or a fourth experiment state comprising a fourth state identifier to one or more of the plurality of client devices, thereby generating additional assigned experiment states for the one or more of the plurality of client devices;

receiving additional response data from the one or more of the plurality of client devices, wherein the additional response data comprises indications of the first state identifier, indications of the second state identifier, indications of the third state identifier, and indications of the fourth state identifier;

determining, from the additional response data and the additional assigned experiment states one or more of:
- at least one allocation match corresponding to assignment of the third experiment state and response of the third experiment state;
- at least one allocation match corresponding to assignment of the fourth experiment state and response of the fourth experiment state;
- at least one allocation mismatch corresponding to assignment of the third experiment state and response of one of: the first experiment state, the second experiment state, or the fourth experiment state; or
- at least one allocation mismatch corresponding to assignment of the fourth experiment state and response of one of: the first experiment state, the second experiment state, or the third experiment state; and generating additional statistical data indicative of one or more of:
- the at least one allocation match corresponding to assignment of the third experiment state and response of third experiment state; or
- the at least one allocation match corresponding to assignment of the fourth experiment state and response of the fourth experiment state; and wherein the experiment parameter is further modified based at least in part on one or more of:

the at least one allocation mismatch corresponding to assignment of the third experiment state and response of one of: the first experiment state, the second experiment state, or the fourth experiment state; or the at least one allocation mismatch corresponding to assignment of the fourth experiment state and response of one of: the first experiment state, the second experiment state, or the third experiment state.

12. The method of claim 5, wherein the second experiment state includes preexisting content present on one or more of the plurality of client devices and the experiment parameter is modified responsive to the at least one allocation mismatch corresponding to assignment of the second experiment state and response of the first experiment state.

13. A non-transitory computer-readable medium storing instructions that, when executed, cause a hardware processor to perform a method of:

accessing communication sessions with a plurality of client devices, wherein at least a subset of the plurality of client devices includes data associated with a first experiment state having a first state identifier, wherein the first experiment state causes the at least a subset of the plurality of client devices to generate output associated with a first set of characteristics;

assigning a second experiment state to a first subset of the plurality of client devices, wherein the second experiment state is associated with a second state identifier and causes the first subset of the plurality of client devices to generate output associated with a second set of characteristics;

assigning a third experiment state to a second subset of the plurality of client devices, wherein the third experiment state is associated with a third state identifier and causes the second subset of the plurality of client devices to generate output associated with the first set of characteristics associated with the first experiment state;

generating assignment data indicating assignments of the second experiment state to the first subset and assignments of the third experiment state to the second subset;

receiving, from the plurality of client devices, response data comprising at least one indication of the first experiment state, at least one indication of the second experiment state, and at least one indication of the third experiment state;

determining, using the response data and the assignment data, one or more of:
  at least one allocation match corresponding to the second experiment state;
  at least one allocation match corresponding to the third experiment state;
  at least one allocation mismatch corresponding to assignment of the second experiment state and response of the third experiment state;
  at least one allocation mismatch corresponding to assignment of the third experiment state and response of the second experiment state; or determining, using the response data, at least one allocation mismatch corresponding to response of the first experiment state;

generating statistical data indicative of one or more of:
  the at least one allocation match corresponding to the second experiment state; or
  the at least one allocation match corresponding to the third experiment state; and causing modification of an experiment parameter based on one or more of:
  the at least one allocation mismatch corresponding to assignment of the second experiment state and response of the third experiment state;
  the at least one allocation mismatch corresponding to assignment of the third experiment state and response of the second experiment state; or
  the at least one allocation match corresponding to the second experiment state.

14. The non-transitory computer-readable medium of claim 13, wherein the response data comprises a quantity of indications of the second experiment state that exceeds a quantity of indications of the third experiment state by an amount exceeding a threshold quantity thereby rendering the response data statistically invalid, and wherein separating at least one allocation mismatch from the response data yields a quantity of indications of the second experiment state generally equal to a quantity of indications of the third experiment state, thereby rendering the response data statistically valid.

15. The non-transitory computer-readable medium of claim 13, wherein the instructions, when executed, further cause the hardware processor to:
  generate an output indicative of one or more of:
    the at least one allocation mismatch corresponding to assignment of the second experiment state and response of the third experiment state;
    the at least one allocation mismatch corresponding to assignment of the third experiment state and response of the second experiment state; or
    the at least one allocation mismatch corresponding to response of the first experiment state.

16. The non-transitory computer-readable medium of claim 13, wherein the instructions, when executed, further cause the hardware processor to:
  determine, based on the at least one allocation mismatch corresponding to response of the first experiment state, one or more of:
    at least one allocation mismatch corresponding to assignment of the second experiment state and output of the first experiment state; or
    at least one allocation mismatch corresponding to assignment of the third experiment state and output of the first experiment state.

17. The non-transitory computer-readable medium of claim 13, wherein the first experiment state comprises a first version of executable content stored on one or more respective client devices of the plurality of client devices, wherein the first version of executable content causes output of one or more features by executing native code on the one or more respective client devices,
  wherein one or more of the second experiment state or the third experiment state comprise a second version of the executable content, and
  wherein the instructions, when executed, further cause the hardware processor to:
    determine the first state identifier associated with the first experiment state; and
    determine, using at least a portion of the response data and the first state identifier, an allocation mismatch corresponding to the first experiment state.

18. The non-transitory computer-readable medium of claim 13, wherein the instructions, when executed, further cause the hardware processor to:

compare the response data corresponding to a respective client device of the plurality of client devices to the assignment data corresponding to the respective client device of the plurality of client devices; and determine a match or a mismatch between the response data and the assignment data.

19. The non-transitory computer-readable medium of claim 13, wherein the instructions, when executed, further cause the hardware processor to:

provide the response data corresponding to a respective client device of the plurality of client devices to an additional hardware processor in communication with a computer-readable storage medium comprising the assignment data corresponding to the respective device of the plurality of client devices; and receive an indication of a match or a mismatch from the additional hardware processor.

20. The non-transitory computer-readable medium of claim 13, wherein one or more of the first experiment state, the second experiment state, or the third experiment state comprise executable content stored on at least one client device of the plurality of client devices, and wherein the executable content causes output of one or more features by executing native code on the at least one client device of the plurality of client devices.

* * * * *